US011987205B2

(12) United States Patent
Yamaguchi et al.

(10) Patent No.: US 11,987,205 B2
(45) Date of Patent: May 21, 2024

(54) BUCKLE DEVICE

(71) Applicant: KABUSHIKI KAISHA TOKAI-RIKA-DENKI-SEISAKUSHO, Aichi (JP)

(72) Inventors: Ryuji Yamaguchi, Aichi-ken (JP); Yoshio Mizuno, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 9 days.

(21) Appl. No.: 17/833,582

(22) Filed: Jun. 6, 2022

(65) Prior Publication Data

US 2022/0396237 A1 Dec. 15, 2022

(30) Foreign Application Priority Data

Jun. 10, 2021 (JP) ................................. 2021-097602

(51) Int. Cl.
B60R 22/28 (2006.01)
B60R 22/18 (2006.01)
B60R 22/26 (2006.01)

(52) U.S. Cl.
CPC .............. *B60R 22/28* (2013.01); *B60R 22/26* (2013.01); *B60R 2022/1806* (2013.01); *B60R 2022/1812* (2013.01)

(58) Field of Classification Search
CPC ... B60R 22/28; B60R 22/26; B60R 2022/281; B60R 2022/288; B60R 2022/289; B60R 2022/1812; B60R 2022/1806

USPC ................................................ 280/801.1, 806
See application file for complete search history.

(56) References Cited

U.S. PATENT DOCUMENTS

| | | | | |
|---|---|---|---|---|
| 4,458,921 A * | 7/1984 | Chiba | ................. | B60R 22/1952 280/806 |
| 6,302,346 B1 * | 10/2001 | Brown | .................... | B60R 22/28 280/805 |
| 10,286,872 B2 * | 5/2019 | Faruque | ................. | B60R 22/22 |
| 11,135,997 B2 * | 10/2021 | Shimazu | ................. | B60R 22/28 |
| 2019/0337482 A1 * | 11/2019 | Grzic | ................. | B60R 22/1952 |
| 2020/0290558 A1 * | 9/2020 | Furukawa | ............... | B60R 22/26 |
| 2023/0067413 A1 * | 3/2023 | Yamaguchi | ........... | B60R 22/185 |

FOREIGN PATENT DOCUMENTS

| | | | |
|---|---|---|---|
| JP | 2002-154404 A | | 5/2002 |
| JP | 2002154404 A | * | 5/2002 |
| JP | 2010-036735 A | | 2/2010 |
| JP | 2020-125010 A | | 8/2020 |
| JP | 2020-147245 A | | 9/2020 |
| WO | WO-2022191383 A1 | * | 9/2022 |

* cited by examiner

*Primary Examiner* — Paul N Dickson
*Assistant Examiner* — Caitlin Anne Miller
(74) *Attorney, Agent, or Firm* — Studebaker & Brackett PC

(57) ABSTRACT

In this buckle device, when a second wind of a belt is pulled out from a spool, a load at which the belt is permitted to be pulled out is small, whereas slide resistance of the belt with respect to a slide face is large. When a first wind of the belt is then pulled out from the spool, the belt pull-out permitting load is large, whereas the slide resistance of the belt with respect to the slide face is small. This enables variation in a load at which extending of a buckle body is permitted to be suppressed.

11 Claims, 10 Drawing Sheets

BUCKLE DEVICE

CROSS-REFERENCE TO RELATED APPLICATION

This application is based on and claims priority under 35 USC 119 from Japanese Patent Application No. 2021-97602 filed on Jun. 10, 2021, the disclosure of which is incorporated by reference herein.

BACKGROUND

Technical Field

The present invention relates to a buckle device in which a buckle body and a take-up shaft are coupled together via a coupling member.

Related Art

In a buckle device disclosed in Japanese Patent Application Laid-Open (JP-A) No. 2020-125010, in a state in which a webbing has been wound onto a spool, a buckle body and the spool are coupled together via the webbing, pull-out of the webbing from the spool is limited, and pull-out of the webbing from the spool is permitted at a pull-out permitting load or greater so that extending of the buckle body is permitted. Moreover, the spool is supported by a frame, a protector is attached to the frame, and the webbing is passed through the protector.

However, JP-A No. 2020-125010 does not clarify whether the webbing slides with respect to the protector when extending of the buckle body is permitted (see paragraph [0049] and FIG. 8, etc.).

SUMMARY

In consideration of the above circumstances, an object of the present invention is to obtain a buckle device capable of suppressing variation in a load at which extending of a buckle body is permitted.

A buckle device of a first aspect of the present invention includes a buckle body configured to engage with a tongue provided at a webbing worn by an occupant; a coupling member coupled to the buckle body; a take-up shaft onto which the coupling member is wound, that is coupled to the buckle body via the coupling member, that is configured to limit pull-out of the coupling member, and that is configured to permit pull-out of the coupling member at a pull-out permitting load or greater so as to permit extending of the buckle body; and a slide section across which the coupling member is configured to slide, wherein, when pull-out of the coupling member from the take-up shaft is permitted, there is a decrease in a combined radius of the coupling member and the take-up shaft at a pull-out position of the coupling member from the take-up shaft so that there is a decrease in a slide resistance of the coupling member with respect to the slide section.

In the buckle device of the first aspect of the present invention, the tongue provided at the webbing worn by an occupant is engaged with the buckle body. The coupling member is coupled to the buckle body, and the coupling member is wound onto the take-up shaft such that the buckle body and the take-up shaft are coupled together via the coupling member and pull-out of the coupling member from the take-up shaft is limited.

Pull-out of the coupling member from the take-up shaft is permitted at the pull-out permitting load or greater so that extending of the buckle body is permitted.

Since the coupling member causes torque to act on the take-up shaft such that pull-out from the take-up shaft is permitted, when there is a decrease in the combined radius of the coupling member and the take-up shaft at the pull-out position of the coupling member from the take-up shaft (hereafter referred to as "the coupling member winding radius"), there is an increase in the pull-out permitting load of the coupling member.

Note that the coupling member is configured to slide against the slide section, and there is a decrease in the coupling member winding radius so that there is a decrease in the slide resistance of the coupling member with respect to the slide section when pull-out of the coupling member from the take-up shaft is permitted. Thus, although there is a decrease in the coupling member winding radius so that there is an increase in the pull-out permitting load of the coupling member, since there is a decrease in the slide resistance of the coupling member with respect to the slide section, variation in a load at which extending of the buckle body is permitted (a combined load of the pull-out permitting load of the coupling member and the slide resistance of the coupling member with respect to the slide section) can be suppressed.

A buckle device of a second aspect of the present invention is the buckle device of the first aspect of the present invention, wherein the coupling member is configured to slide in a state in which the coupling member is bent with respect to the slide section; and when pull-out of the coupling member from the take-up shaft is permitted, there is a decrease in the combined radius of the coupling member and the take-up shaft at the pull-out position of the coupling member from the take-up shaft so that there is a decrease in a bend angle of the coupling member by the slide section.

In the buckle device of the second aspect of the present invention, the coupling member is configured to slide in a state in which the coupling member is bent with respect to the slide section. When pull-out of the coupling member from the take-up shaft is permitted, there is a decrease in the coupling member winding radius so that there is a decrease in the bend angle of the coupling member by the slide section. This enables the slide resistance of the coupling member with respect to the slide section to be decreased using a simple configuration.

A buckle device of a third aspect of the present invention is the buckle device of the first aspect or the second aspect of the present invention, further including a support body configured to support the take-up shaft, a portion of the support body that is closest at a pull-out side of the coupling member from the take-up shaft relative to the pull-out position of the coupling member from the take-up shaft being covered by the slide section.

In the buckle device of the third aspect of the present invention, the support body supports the take-up shaft, and the portion of the support body that is closest at the pull-out side of the coupling member from the take-up shaft relative to the pull-out position of the coupling member from the take-up shaft is covered by the slide section. This enables a slide position of the coupling member with respect to the slide section to be made closer to the pull-out position of the coupling member from the take-up shaft, thereby enabling the slide resistance of the coupling member with respect to the slide section to be large.

A buckle device of a fourth aspect of the present invention is the buckle device of any one of the first aspect to the third aspect of the present invention, wherein the coupling member is configured to slide against the slide section during a period from a start to an end of pull-out of the coupling member from the take-up shaft being permitted.

In the buckle device of the fourth aspect of the present invention, the coupling member slides against the slide section during the period from the start to the end of pull-out of the coupling member from the take-up shaft being permitted. This enables fluctuation in the load at which extending of the buckle body is permitted due to the coupling member momentarily not sliding against the slide section to be suppressed.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
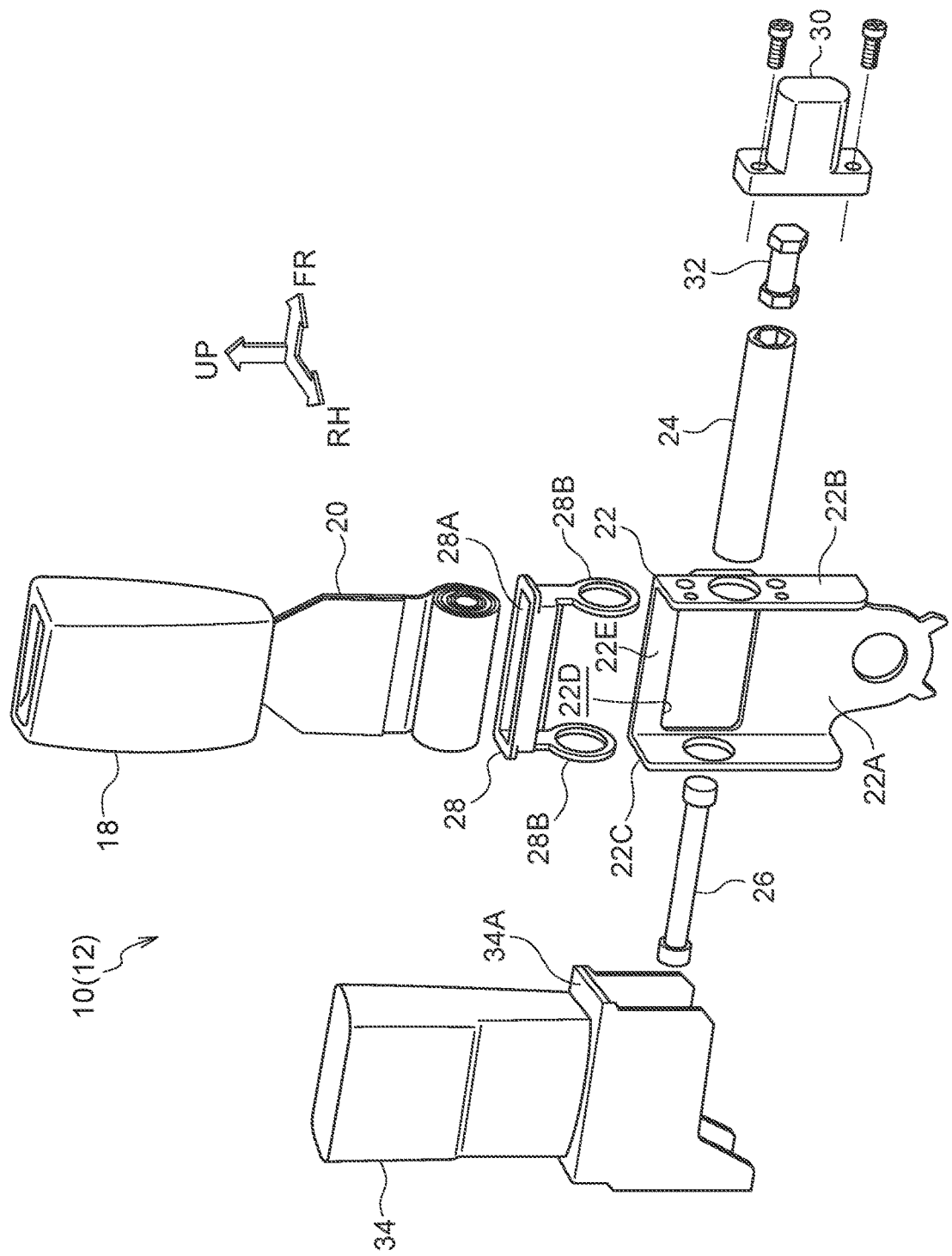
FIG. 1 is an exploded perspective view illustrating a buckle device according to a first exemplary embodiment of the present invention, as viewed obliquely from the front-right.
Figure 2:
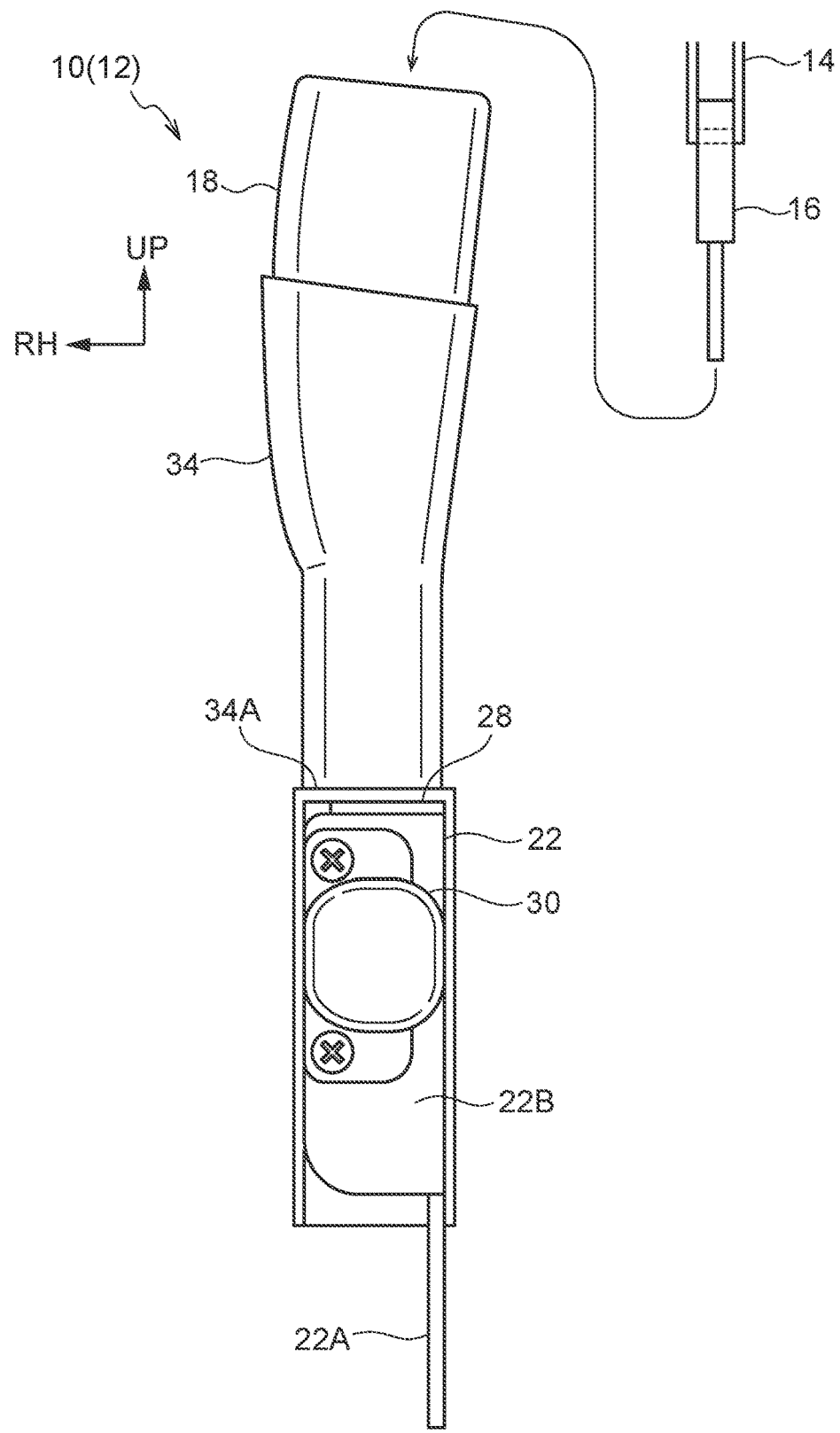
FIG. 2 is a side view illustrating the buckle device according to the first exemplary embodiment of the present invention, as viewed from the front.
Figure 3:
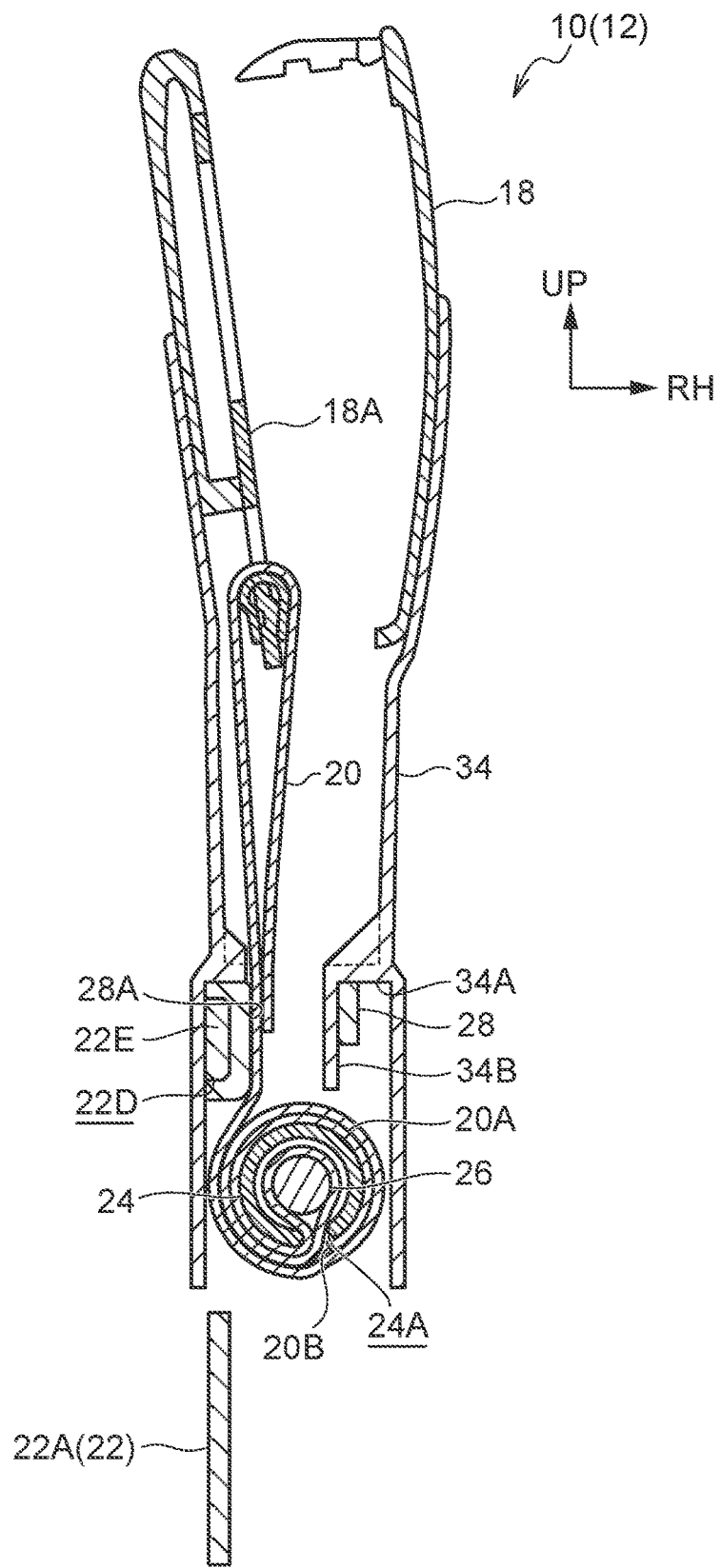
FIG. 3 is a cross-section illustrating the buckle device according to the first exemplary embodiment of the present invention, as viewed from the rear.

FIG. 1 is an exploded perspective view illustrating a buckle device 10 according to a first exemplary embodiment of the present invention, as viewed obliquely from the front-right. FIG. 2 is a side view illustrating the buckle device 10 as viewed from the front. FIG. 3 is a cross-section illustrating the buckle device 10 as viewed from the rear. Note that in the drawings, the arrow FR indicates a front side of the buckle device 10, the arrow RH indicates a right side (outward-facing side) of the buckle device 10, and the arrow UP indicates an upper side of the buckle device 10.

The buckle device 10 according to the present exemplary embodiment configures a seatbelt device 12 of a vehicle (automobile). The seatbelt device 12 is applied to a seat (not illustrated in the drawings) inside a vehicle cabin. A take-up device (not illustrated in the drawings) is provided to the seatbelt device 12. The take-up device is installed at a vehicle width direction outside and lower side of a rear section of the seat. An elongated belt-shaped webbing 14 (see FIG. 2) is taken up onto the take-up device from its base end side. The webbing 14 is urged toward its take-up side onto the take-up device, and is pulled out toward the upper side from the take-up device. A lock mechanism is provided to the take-up device. In a vehicle emergency (such as a collision), the lock mechanism locks pull-out of the webbing 14 from the take-up device.

A movable location of the webbing 14 further toward its leading end side than the take-up device is passed through a through anchor (not illustrated in the drawings). The through anchor is installed at the vehicle width direction outside and upper side of the seat rear section. An anchor (not illustrated in the drawings) is fixed to a leading end portion of the webbing 14. The anchor is installed at the vehicle width direction outside and lower side of the seat rear section. A movable location of the webbing 14 between the through anchor and the anchor is passed through a tongue 16 (see FIG. 2).

The buckle device 10 is installed at the vehicle width direction inside and lower side of the seat rear section. The front, right, and upper sides of the buckle device 10 respectively correspond to a front or rear side, a vehicle width direction inside, and an upper side of the vehicle.

As illustrated in FIG. 1 to FIG. 3, a substantially rectangular-bodied buckle body 18 is provided at an upper section of the buckle device 10. The tongue 16 is capable of engaging with the buckle body 18 from the upper side. When the tongue 16 has engaged with the buckle body 18, the webbing 14 is worn by an occupant seated in the seat. Thus, a portion of the webbing 14 between the through anchor and the tongue 16 (shoulder webbing) is pulled obliquely across the occupant from one shoulder to their lumbar region (including their chest), and a portion of the webbing 14 between the tongue 16 and the anchor (lap webbing) is pulled horizontally across the lumbar region of the occupant. The engagement of the tongue 16 to the buckle body 18 can be released. When the engagement of the tongue 16 to the buckle body 18 is released, the occupant is released from wearing the webbing 14.

A lower side portion of the buckle body 18 gradually becomes smaller in a left-right direction on progression toward the lower side. A coupling plate 18A made of metal is provided inside the buckle body 18. The coupling plate 18A is exposed at the lower side of the buckle body 18.

Figure 4:
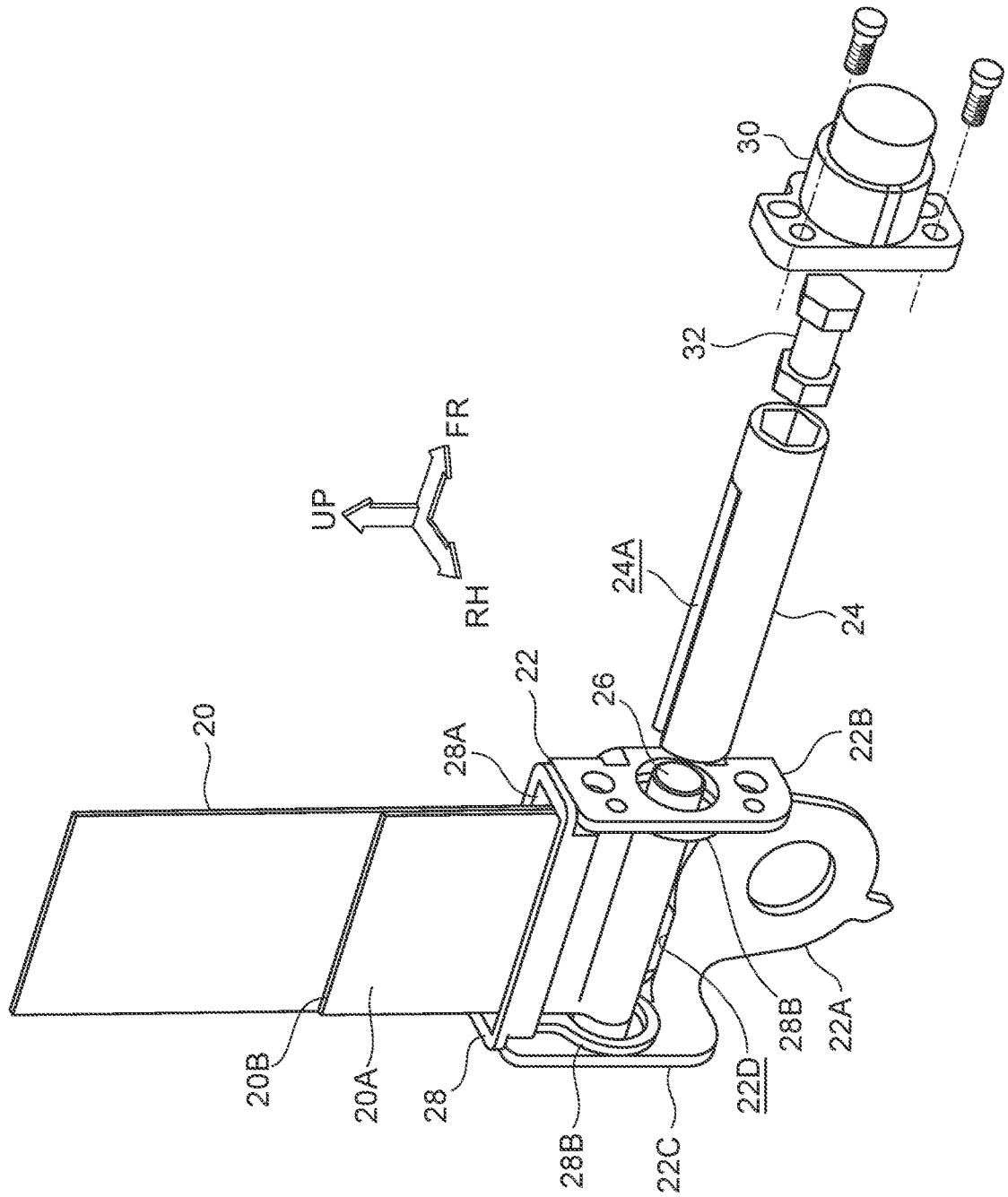
FIG. 4 is an exploded perspective view illustrating the interior of the buckle device according to the first exemplary embodiment of the present invention, as viewed obliquely from the front-right.
Figure 5:
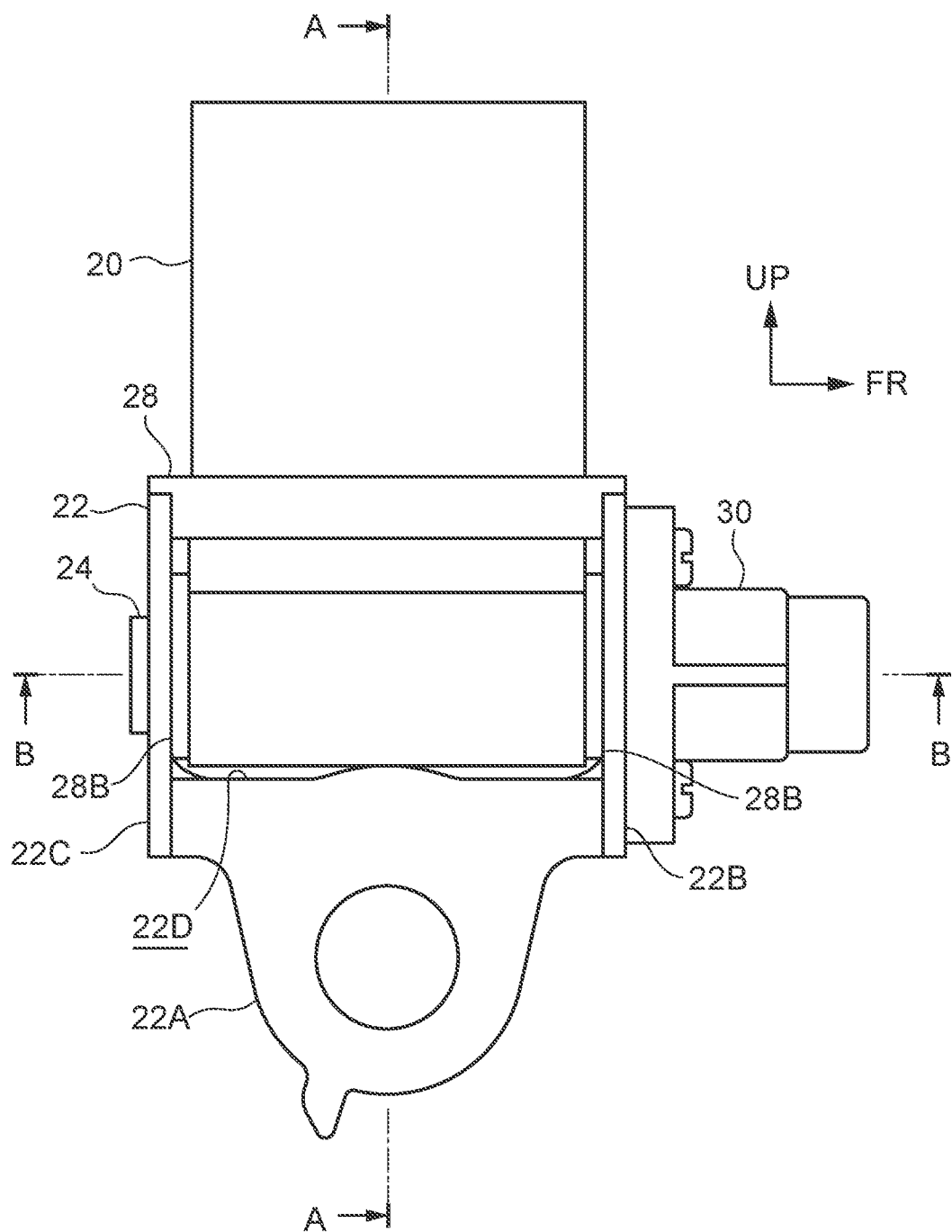
FIG. 5 is a face-on view illustrating the interior of the buckle device according to the first exemplary embodiment of the present invention, as viewed from the right.

A belt-shaped belt 20 (webbing) serving as a coupling member, is provided at the lower side of the buckle body 18. The belt 20 is for example made of the same material as the webbing 14. A leading end side portion (upper side portion) of the belt 20 is passed through the coupling plate 18A of the buckle body 18. A leading end portion (upper side end portion) of the belt 20 is folded back on itself and is stitched to a location of the belt 20 in the vicinity of the leading end portion. Thus, the leading end side portion of the belt 20 is ring shaped and is coupled to the buckle body 18 (coupling plate 18A). A base end portion 20A (lower side end portion) of the belt 20 is folded back on itself toward the right side and stitched to a location of the belt 20 in the vicinity of the base end portion 20A. Thus, a base end side portion (lower side portion) of the belt 20 is ring shaped (see FIG. 4).

A frame 22 (see FIG. 4, FIG. 5, FIG. 6A, and FIG. 6B), made of metal and serving as a support body, is provided at a lower section of the buckle device 10. The frame 22 has a U-plate shaped cross-section profile. A back plate 22A is provided at a left portion of the frame 22. A lower end portion of the back plate 22A of the frame 22 is fixed to the vehicle body (such as a lower-rear section of the seat). A leg plate 22B and a leg plate 22C are respectively provided at a front portion and a rear portion of the frame 22. The leg plate 22B and the leg plate 22C project toward the right from the back plate 22A. A rectangular placement hole 22D is formed penetrating an upper portion of the back plate 22A. The placement hole 22D extends in the front-rear direction along substantially the entire back plate 22A, and the leg plate 22B and the leg plate 22C are respectively disposed at the front side and rear side thereof. A portion of the back plate 22A further toward the upper side than the placement hole 22D configures a placement tab 22E.

A substantially circular tube-shaped spool 24, serving as a take-up shaft, is supported by the frame 22. The spool 24 is made of metal and has a high strength. The spool 24 is passed through the leg plate 22B and the leg plate 22C of the frame 22 such that the spool 24 is capable of rotating about its center axial line. An axial direction of the spool 24 runs parallel to a front-rear direction. The spool 24 is disposed at the right side of the placement hole 22D in the frame 22 (back plate 22A). An elongated rectangular insertion hole 24A is formed penetrating a portion of the spool 24 excluding a front portion thereof. The insertion hole 24A extends along the axial direction of the spool 24. The insertion hole 24A is open toward the rear side. Both width direction end faces of the insertion hole 24A are each curved so as to have a semicircular cross-section projecting toward the insertion hole 24A.

An outer circumference of the spool 24 has a uniform radius around a circumferential direction of the spool 24, with the exception of the portion where the insertion hole 24A is formed.

A substantially circular column-shaped bar 26, made of metal and serving as an anchor member, is coaxially inserted inside the spool 24. Both axial direction end portions of the bar 26 each have an enlarged diameter that is coaxial to the spool 24 and fitted inside the spool 24. The base end side portion (ring-shaped portion) of the belt 20 is inserted through the insertion hole 24A in the spool 24, and an axial direction intermediate portion of the bar 26 is inserted inside the base end side portion. The base end side portion of the belt 20 is thereby coupled to the spool 24 via the bar 26. The belt 20 is wound onto the spool 24 approximately 1.5 times. The base end portion 20A (folded-back portion) is disposed further toward the spool 24 than a location of the belt 20 in the vicinity of the base end portion 20A. A base end 20B (a leading end of the folded-back portion) of the belt 20 is disposed in a gap between a portion of the belt 20 extending out through the insertion hole 24A and a peripheral face of the insertion hole 24A. The base end 20B of the belt 20 opposes the portion of the belt 20 extending out through the insertion hole 24A in a state close to this portion in the spool 24-circumferential direction. The portion of the belt 20 that has been wound onto the spool 24 is inserted through the placement hole 22D in the frame 22 (back plate 22A), such that the belt 20 is pulled out toward the upper side from the left side of the spool 24.

A substantially rectangular tube-shaped protector 28, made of resin and serving as a slide section, is fitted inside the upper portion of the frame 22. The belt 20 is inserted through the inside of the protector 28. A front portion and a rear portion of the protector 28 each have an inverted L-shaped cross-section. Upper portions of the front portion and the rear portion of the protector 28 are respectively mounted on the upper sides of the leg plate 22B and the leg plate 22C of the frame 22. A left portion of the protector 28 has a U-shaped cross-section. The inside of the left portion of the protector 28 is open toward the left side, and the placement tab 22E of the back plate 22A of the frame 22 is fitted into this opening. A left face inside the protector 28 configures a slide face 28A. The slide face 28A is disposed further toward the right side than a left end of the portion of the belt 20 wound onto the spool 24 and a left end of the spool 24. The belt 20 makes face-to-face contact with the slide face 28A and is bent by a lower end of the slide face 28A. Circular ring plate-shaped rings 28B are integrally formed to the front portion and the rear portion of the protector 28. The rings 28B project toward the lower side, and the spool 24 is fitted inside the rings 28B.

A bottomed, substantially circular tube-shaped case 30 made of metal is fixed to the front side of the frame 22 (leg plate 22B). The front portion of the spool 24 is inserted inside the case 30. A substantially circular column-shaped torsion shaft 32, made of metal and serving as an energy absorption member, is disposed inside the case 30. A front end portion of the torsion shaft 32 is fitted inside the case 30 so as to be incapable of rotating relative thereto. An inner peripheral face of the front portion of the spool 24 is shaped such that a rear end portion of the torsion shaft 32 can be fitted therein. The rear end portion of the torsion shaft 32 is thereby coupled to the front portion of the spool 24 so as to be incapable of rotating relatively thereto, and so limits rotation of the spool 24.

A substantially rectangular tube-shaped boot 34 (cover), serving as a covering member, is provided over a range spanning from the buckle body 18 to the frame 22. The boot 34 is made of a soft flexible resin. An upper portion of the boot 34 gradually becomes smaller in the left-right direction on progression toward the lower side. The lower side portion of the buckle body 18 is fitted inside the upper portion of the boot 34 such that the boot 34 limits movement of the buckle body 18 toward the lower side. The belt 20 is inserted through the inside of an up-down direction intermediate portion of the boot 34. The inside of a lower portion of the boot 34 is open toward the front side, and the frame 22 (including the protector 28, the spool 24, and the bar 26) is fitted inside this lower portion. A rectangular frame plate-shaped abutting frame 34A is integrally formed directly above the lower portion of the boot 34. The belt 20 is inserted through the inside of the abutting frame 34A. An upper portion of the protector 28 abuts the lower side of the abutting frame 34A, thereby limiting movement of the boot 34 toward the lower side. A rectangular plate-shaped insertion portion 34B is integrally formed to the lower side of a right portion of the abutting frame 34A. A left face of the insertion portion 34B is flush against a right face at the inside of the abutting frame 34A. The insertion portion 34B is inserted inside the protector 28. The insertion portion 34B abuts a right face at the inside of the protector 28 and is fitted inside the protector 28 in the front-rear direction. In a state in which tensile force is acting on the belt 20 due to the belt 20 having been wound onto the spool 24 as described previously, elastic compression force acts on a location of the boot 34 between the buckle body 18 and the frame 22, such that the boot 34 urges the frame 22 toward the lower side and stands independently to the frame 22, and also urges the buckle body 18 toward the upper side so as to stand independently.

Next, explanation follows regarding operation of the present exemplary embodiment.

In the buckle device 10 of the seatbelt device 12 with the above-described configuration, the torsion shaft 32 limits rotation of the spool 24, such that pull-out of the belt 20 from the spool 24 and extending of the buckle body 18 toward the upper side is limited. When the tongue 16 of the webbing 14 is engaged with the buckle body 18, the webbing 14 is worn by the occupant.

In a vehicle emergency (such as a collision), the lock mechanism of the take-up device locks pull-out of the webbing 14 from the take-up device, such that the occupant is restrained by the webbing 14. In for example cases in which force due to inertia acts on the occupant such that the webbing 14 is pulled by the occupant, a force so as to pull out the belt 20 from the spool 24 is applied from the webbing 14 via the tongue 16 and the buckle body 18, such that rotation force acts on the spool 24. In cases in which the torsion shaft 32 is twisted and deformed by this rotation force acting on the spool 24, rotation of the spool 24 is permitted and pull-out of the belt 20 from the spool 24 is permitted, such that extending of the buckle body 18 (including the tongue 16) toward the upper side is permitted. Load acting on the occupant (particularly on their chest) from the webbing 14 is thereby alleviated (limited by an extending-permitting load (force limiter load) on the buckle body 18), and kinetic energy of the occupant is absorbed by torsional deformation of the torsion shaft 32.

Figure 6A:
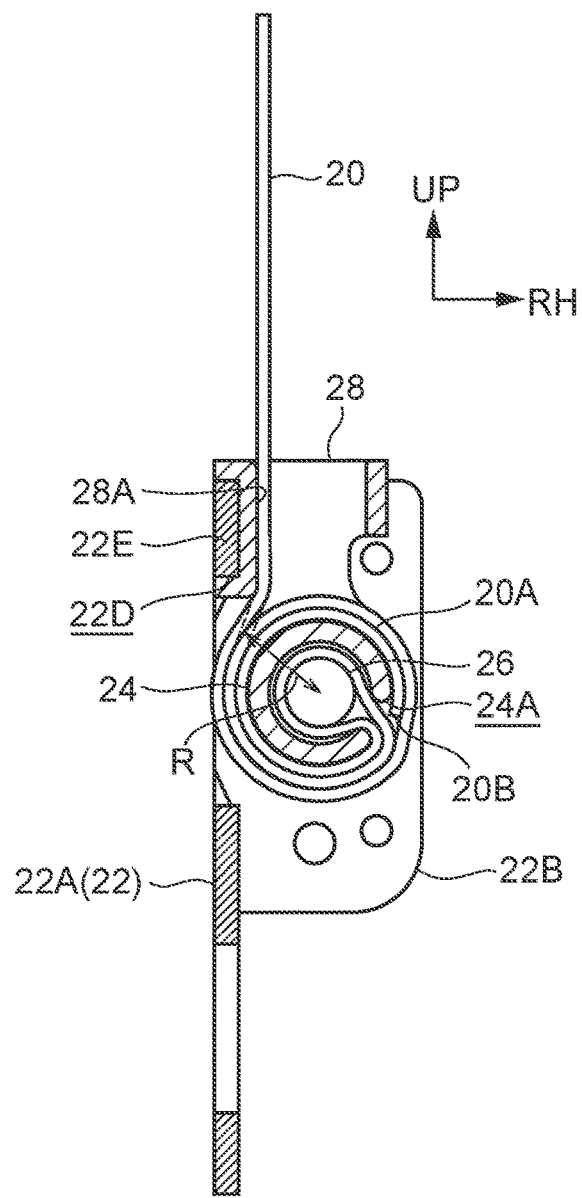
FIG. 6A is a cross-section (sectioned along line A-A in FIG. 5) illustrating the interior of the buckle device according to the first exemplary embodiment of the present invention, as viewed from the rear.
Figure 6B:
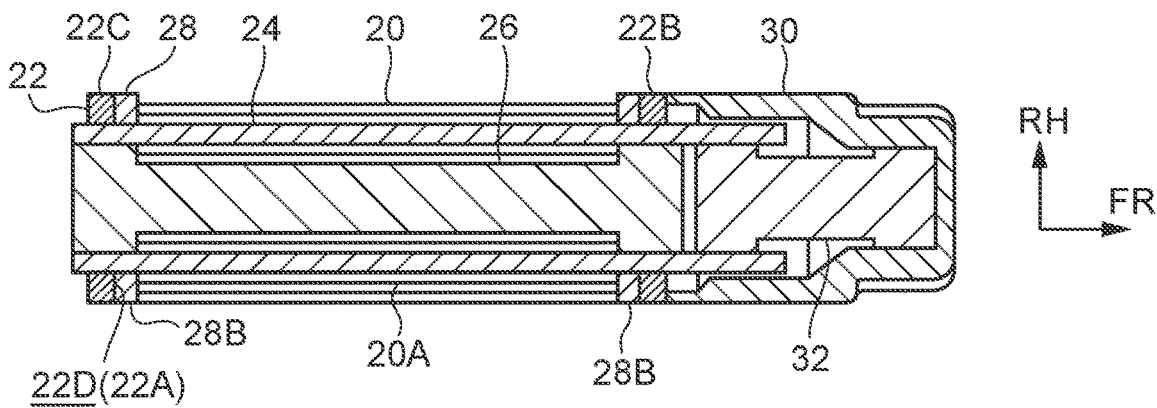
FIG. 6B is a cross-section (sectioned along line B-B in FIG. 5) illustrating the interior of the buckle device according to the first exemplary embodiment of the present invention, as viewed from below.

Since the belt 20 causes torque to act on the spool 24 such that pull-out of the belt 20 from the spool 24 is permitted, when there is a decrease in a combined radius of the belt 20 and the spool 24 at a pull-out position of the belt 20 from the spool 24 (hereafter referred to as the "belt 20-winding radius R"; see FIG. 6A), the load at which pull-out of the belt 20 from the spool 24 is permitted (hereafter referred to as the "belt 20-pull-out permitting load) increases. In particular, the spool 24 has a small radius such that the thickness of the belt 20 is large in proportion to the radius of the spool 24, and the belt 20 has been wound approximately 1.5 times onto the spool 24 such that the belt 20-winding radius R is small. Thus, the proportional increase in the belt 20-pull-out permitting load by the decrease in the belt 20-winding radius R is large.

Figure 7C:
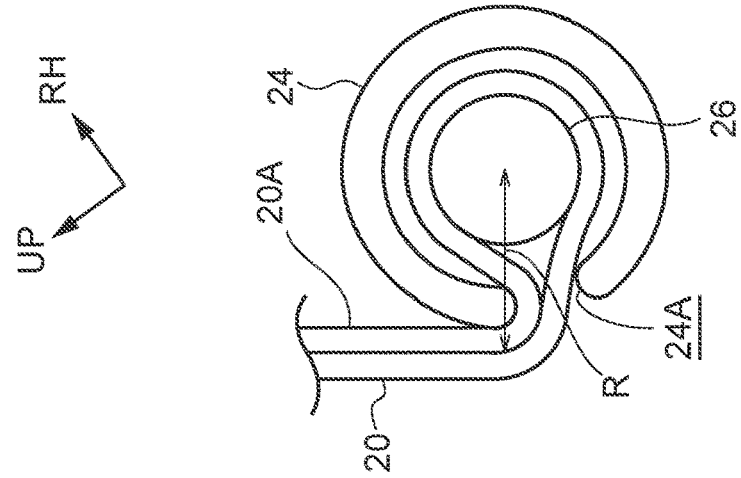
FIG. 7C is a cross-section illustrating a state after to the belt has been fully pulled out from the spool in the buckle device according to the first exemplary embodiment of the present invention, as viewed from the rear.
Figure 7B:
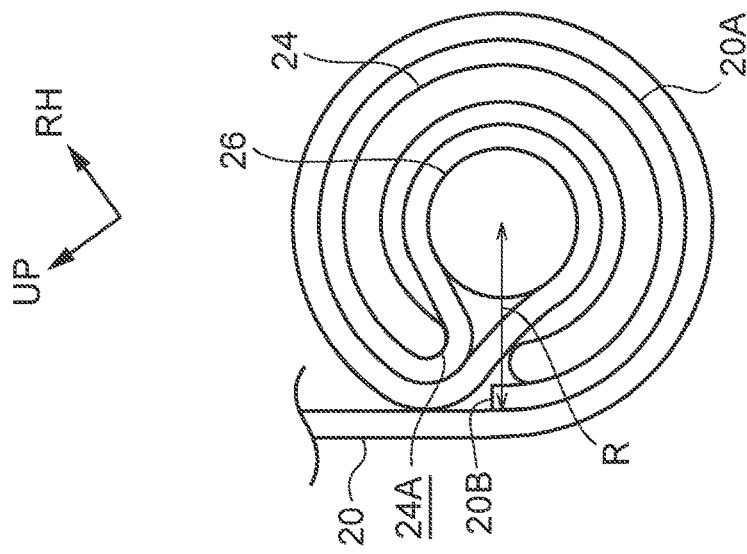
FIG. 7B is a cross-section illustrating a state while the belt is being pulled out from the spool in the buckle device according to the first exemplary embodiment of the present invention, as viewed from the rear.
Figure 7A:
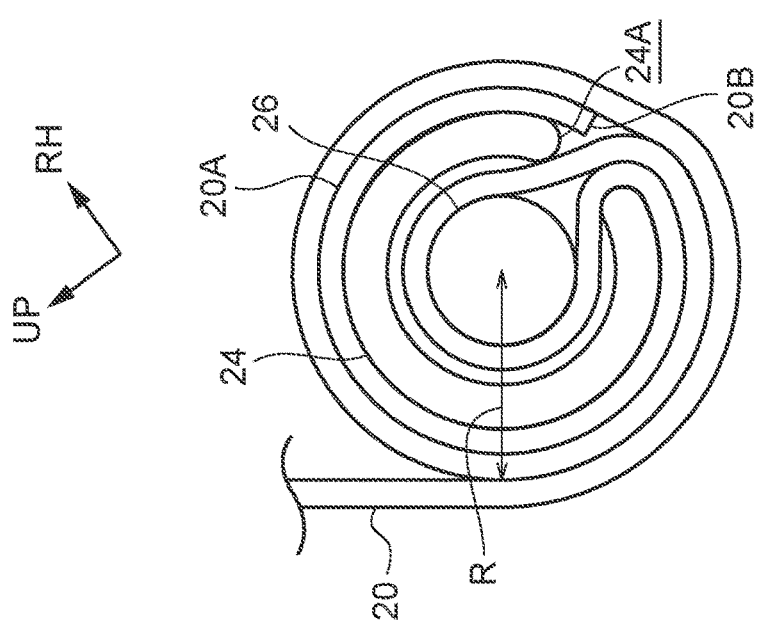
FIG. 7A is a cross-section illustrating a state prior to a belt being pulled out from a spool in the buckle device according to the first exemplary embodiment of the present invention, as viewed from the rear.
Figure 8:
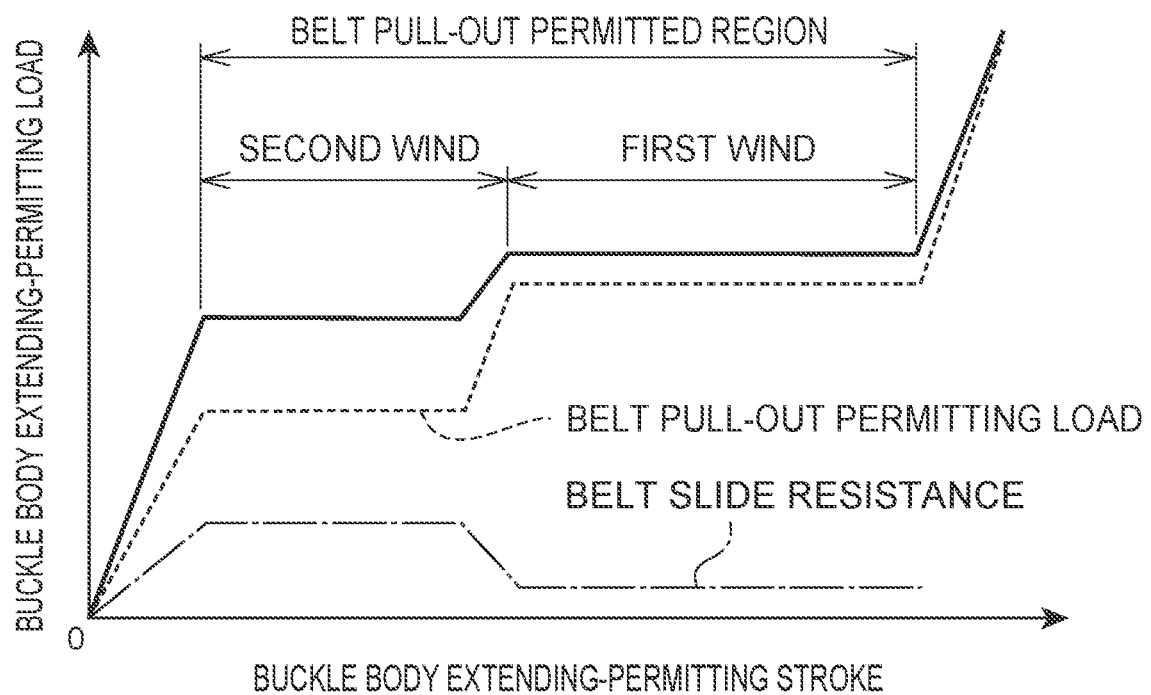
FIG. 8 is a graph illustrating a relationship between extending-permitting stroke of a buckle body (horizontal axis) and extending-permitting load on the buckle body (vertical axis) in the buckle device according to the first exemplary embodiment of the present invention.

For example, as illustrated by dotted lines in FIG. 8, when a second wind (second lap) of the belt 20 is pulled out from the spool 24 (see FIG. 7A), the belt 20-winding radius R is large, and so the belt 20-pull-out permitting load is small. When a first wind (first lap) of the belt 20 is then pulled out from the spool 24 (see FIG. 7B and FIG. 7C), the belt 20-winding radius R is small, and so the belt 20-pull-out permitting load is large.

Note that when pull-out of the belt 20 from the spool 24 is permitted, the belt 20 slides against the slide face 28A in a state in which the belt 20 has been bent by the lower end of the slide face 28A (a left face at the inside) of the protector 28 (see FIG. 6A). As illustrated by the single-dotted dashed line in FIG. 8, when the second wind of the belt 20 is pulled out from the spool 24, a bend angle of the belt 20 by the lower end of the slide face 28A is large, such that the slide resistance of the belt 20 with respect to the slide face 28A is large. When the first wind of the belt 20 is then pulled out from the spool 24 (see the double-dotted dashed line in FIG. 6A), the bend angle of the belt 20 by the lower end of the slide face 28A is small, such that the slide resistance of the belt 20 with respect to the slide face 28A is small.

Thus, as illustrated in FIG. 8, when the second wind of the belt 20 is pulled out from the spool 24, although the belt 20-pull-out permitting load is small, the slide resistance of the belt 20 with respect to the slide face 28A is large. When the first wind of the belt 20 is then pulled out from the spool 24, the belt 20-pull-out permitting load is large, but the slide resistance of the belt 20 with respect to the slide face 28A is small. This enables variation in the load at which extending of the buckle body 18 is permitted (a combined load of the belt 20-pull-out permitting load and the slide resistance of the belt 20 with respect to the slide face 28A; force limiter load) to be suppressed, enables a rapid increase in the load at which extending of the buckle body 18 is permitted and therefore load acting on the occupant from the webbing 14 to be suppressed, and therefore enables the occupant to be well-protected.

Furthermore, when the belt 20-winding radius R has changed, the bend angle of the belt 20 by the lower end of the slide face 28A also changes, such that the slide resistance of the belt 20 with respect to the slide face 28A changes. This enables the slide resistance of the belt 20 with respect to the slide face 28A to be changed using a simple configuration.

Moreover, a portion of the frame 22 closest at the pull-out side (upper side) of the belt 20 from the spool 24 relative to a pull-out position of the belt 20 from the spool 24 (i.e. an upper face of the placement hole 22D) is covered by a left portion of the protector 28 (including the slide face 28A). This enables a slide position of the belt 20 with respect to the slide face 28A (in particular a bend position by the lower end of the slide face 28A) to be made closer to the pull-out position of the belt 20 from the spool 24, thereby enabling slide resistance of the belt 20 with respect to the slide face 28A to be large, particularly when the second wind of the belt 20 is pulled out from the spool 24.

Furthermore, the belt 20 slides against the slide face 28A during a period from a start to an end of pull-out of the belt 20 from the spool 24 being permitted (in the present exemplary embodiment, up to a point in time before the belt 20-pull-out permitting load rises rapidly). This enables fluctuation in the load at which extending of the buckle body 18 is permitted due to the belt 20 momentarily not sliding against the slide face 28A to be suppressed.

Moreover, in a state in which tensile force is acting on the belt 20 due to the belt 20 having been wound onto the spool 24, elastic compression force acts on a location of the boot 34 between the buckle body 18 and the frame 22, such that the boot 34 urges the frame 22 toward the lower side and stands independently to the frame 22. This reduces the need to provide a separate fixing member to fix the boot 34 to the frame 22 in order to make the boot 34 stand independently to the frame 22.

Furthermore, the insertion portion 34B of the boot 34 is inserted inside the protector 28. This enables the ability of the boot 34 to stand independently to the frame 22 to be increased.

Second Exemplary Embodiment

Figure 9:
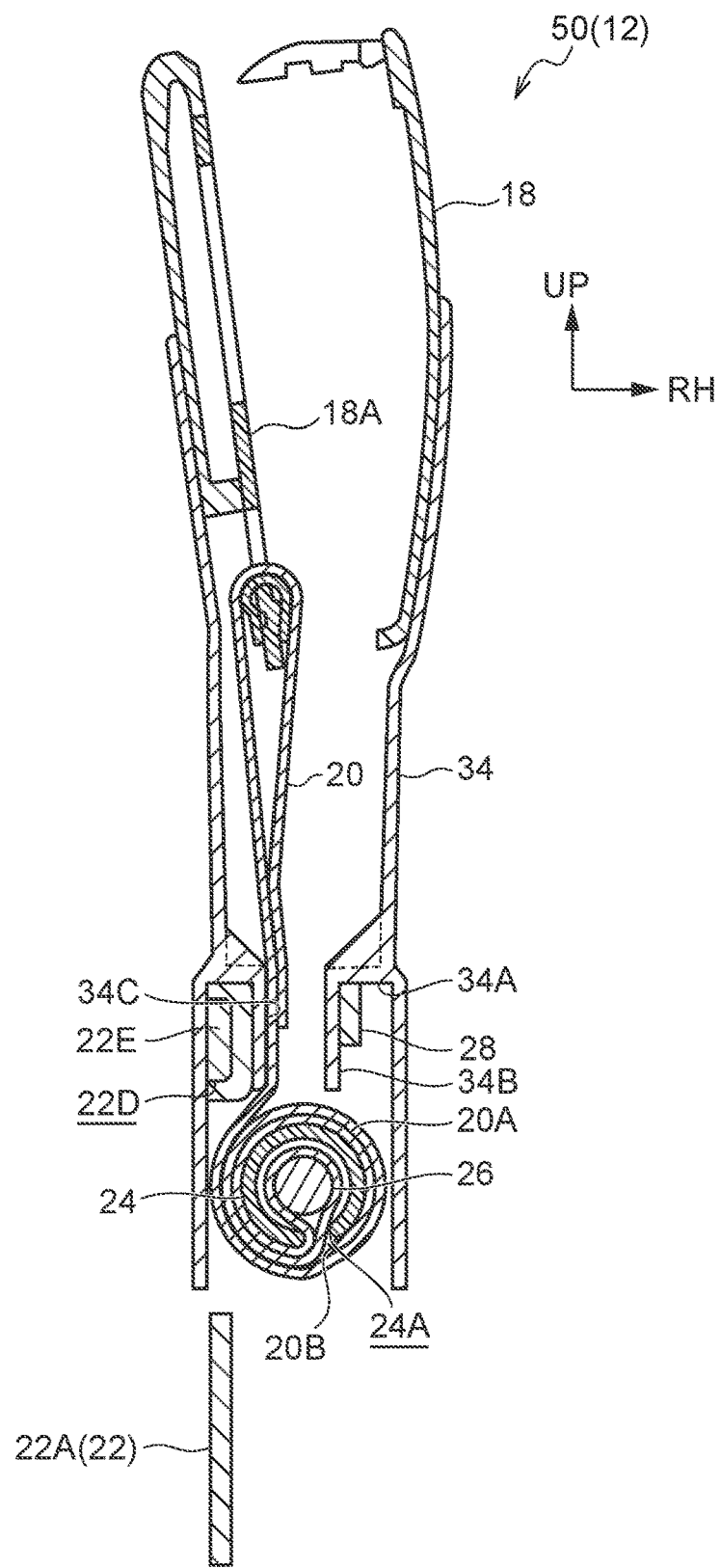
FIG. 9 is a cross-section illustrating a buckle device according to a second exemplary embodiment of the present invention, as viewed from the rear.
Figure 10:
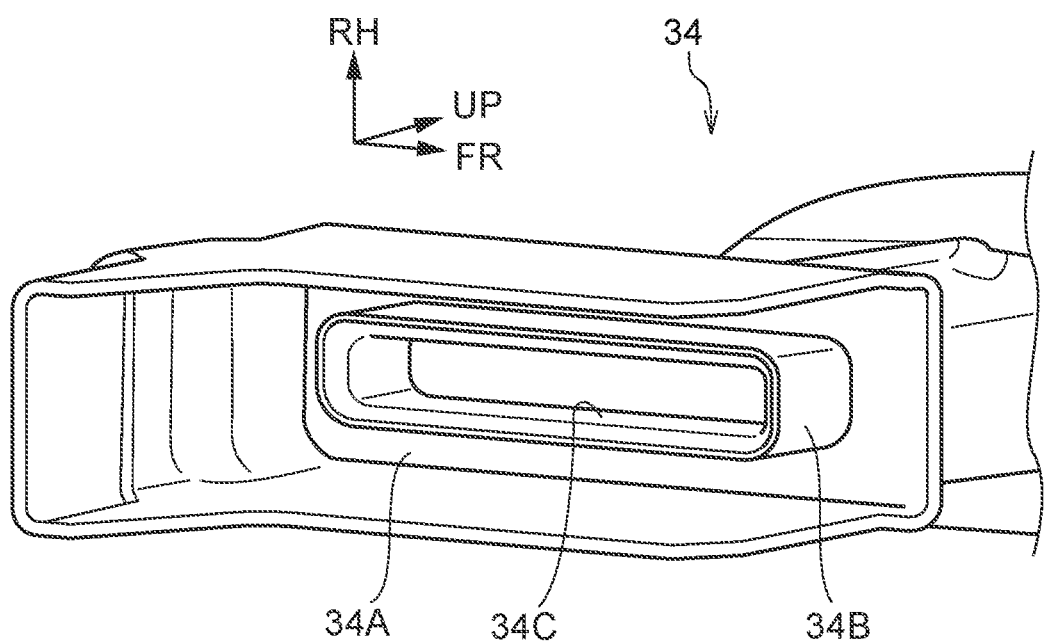
FIG. 10 is a perspective view illustrating a boot of the buckle device according to the second exemplary embodiment of the present invention, as viewed obliquely from the lower-front.

FIG. 9 is a cross-section illustrating a buckle device 50 according to a second exemplary embodiment of the present invention, as viewed from the rear. FIG. 10 is a perspective view illustrating a boot 34 of the buckle device 50, as viewed obliquely from the lower-front.

The buckle device 50 according to the present exemplary embodiment has basically the same configuration as the first exemplary embodiment, but differs in the following points.

As illustrated in FIG. 9 and FIG. 10, in the boot 34 (slide section) of the buckle device 50 according to the present exemplary embodiment, the insertion portion 34B has a rectangular tube shape, and an inner peripheral face of the insertion portion 34B is flush against an inner peripheral face of the abutting frame 34A. The insertion portion 34B is fitted inside the protector 28. The insertion portion 34B covers the entire inner peripheral face of the protector 28, and the belt 20 is inserted through an inner portion of the insertion portion 34B. A left face inside the insertion portion 34B configures a slide face 34C. The slide face 34C is disposed further toward the right side than the left end of the portion of the belt 20 that has been wound onto the spool 24 and the left end of the spool 24. The belt 20 makes face-to-face contact with the slide face 34C, and is bent by a lower end of the slide face 34C.

Note that in cases in which pull-out of the belt 20 from the spool 24 is permitted, the belt 20 slides against the slide face 34C in a state in which the belt 20 has been bent by the lower end of the slide face 34C of the boot 34. When the second wind of the belt 20 is pulled out from the spool 24, the bend angle of the belt 20 by the lower end of the slide face 34C is large, such that slide resistance of the belt 20 with respect to the slide face 34C is large. When the first wind of the belt 20 is then pulled out from the spool 24, the bend angle of the belt 20 by the lower end of the slide face 34C is small, such that slide resistance of the belt 20 with respect to the slide face 34C is small.

Thus, the present exemplary embodiment enables similar operation and advantageous effects to those in the first exemplary embodiment to be exhibited.

Furthermore, the insertion portion 34B of the boot 34 is fitted inside the protector 28. This enables the ability of the boot 34 to stand independently to the frame 22 to be still further improved.

Note that the belt 20 is wound onto the spool 24 approximately 1.5 times in the first exemplary embodiment and the second exemplary embodiment. However, the belt 20 may be wound onto the spool 24 more or less than approximately 1.5 times (such as two or more times).

Moreover, in the first exemplary embodiment and the second exemplary embodiment, the torsion shaft 32 (energy absorption member) undergoes torsional deformation to permit rotation of the spool 24. However, rotation of the spool 24 may be permitted due to a bent rod-shaped energy absorption member being moved and squeezed along its length direction (due to a bend position of the energy absorption member being displaced). Furthermore, rotation of the spool 24 may be permitted while the energy absorption member generates friction force.

What is claimed is:

1. A buckle device comprising:
   a buckle body configured to engage with a tongue provided at a webbing worn by an occupant;
   a coupling member coupled to the buckle body;
   a take-up shaft onto which the coupling member is wound, that is coupled to the buckle body via the coupling member, that is configured to limit pull-out of the coupling member, and that is configured to permit pull-out of the coupling member at a pull-out permitting load or greater so as to permit extending of the buckle body; and
   a slide section across which the coupling member is configured to slide,
   wherein, when pull-out of the coupling member from the take-up shaft is permitted, a combined radius of the coupling member and the take-up shaft at a pull-out position of the coupling member from the take-up shaft becomes smaller so that a slide resistance of the coupling member with respect to the slide section becomes smaller.

2. The buckle device of claim 1, wherein:
   the coupling member is configured to slide in a state in which the coupling member is bent with respect to the slide section; and
   when pull-out of the coupling member from the take-up shaft is permitted, there is a decrease in the combined radius of the coupling member and the take-up shaft at the pull-out position of the coupling member from the take-up shaft so that there is a decrease in a bend angle of the coupling member by the slide section.

3. The buckle device of claim 1, further comprising a support body configured to support the take-up shaft, a portion of the support body that is closest at a pull-out side of the coupling member from the take-up shaft relative to the pull-out position of the coupling member from the take-up shaft being covered by the slide section.

4. The buckle device of claim 1, wherein the coupling member is configured to slide against the slide section during a period from a start to an end of pull-out of the coupling member from the take-up shaft being permitted.

5. The buckle device of claim 1, wherein the coupling member is disposed in face-to-face contact with the slide section.

6. The buckle device of claim 1, wherein the buckle body and the take-up shaft are coupled together via the coupling member in a state in which tensile force is being applied to the coupling member.

7. The buckle device of claim 1, wherein two layers of the coupling member are wound onto the take-up shaft at a first wind of the coupling member.

8. The buckle device of claim 1, wherein one layer of the coupling member is wound onto the take-up shaft at a second wind of the coupling member.

9. The buckle device of claim 1, wherein the take-up shaft is configured to slide with respect to the slide section.

10. The buckle device of claim 1, wherein the slide section is configured to support the buckle body.

11. The buckle device of claim 1, wherein the pull-out permitting load of the take-up shaft increases with the amount of pull-out of the coupling member such that the reduction in the slide resistance of the coupling member with respect to the slide section suppresses a variation in the load applied against a vehicle occupant by the coupling member when pull-out of the coupling member from the take-up shaft is permitted.

* * * * *